April 9, 1963  D. A. HUELSKAMP  3,084,512
HYDRAULIC MOLDING MACHINES
Filed March 10, 1958  2 Sheets-Sheet 1
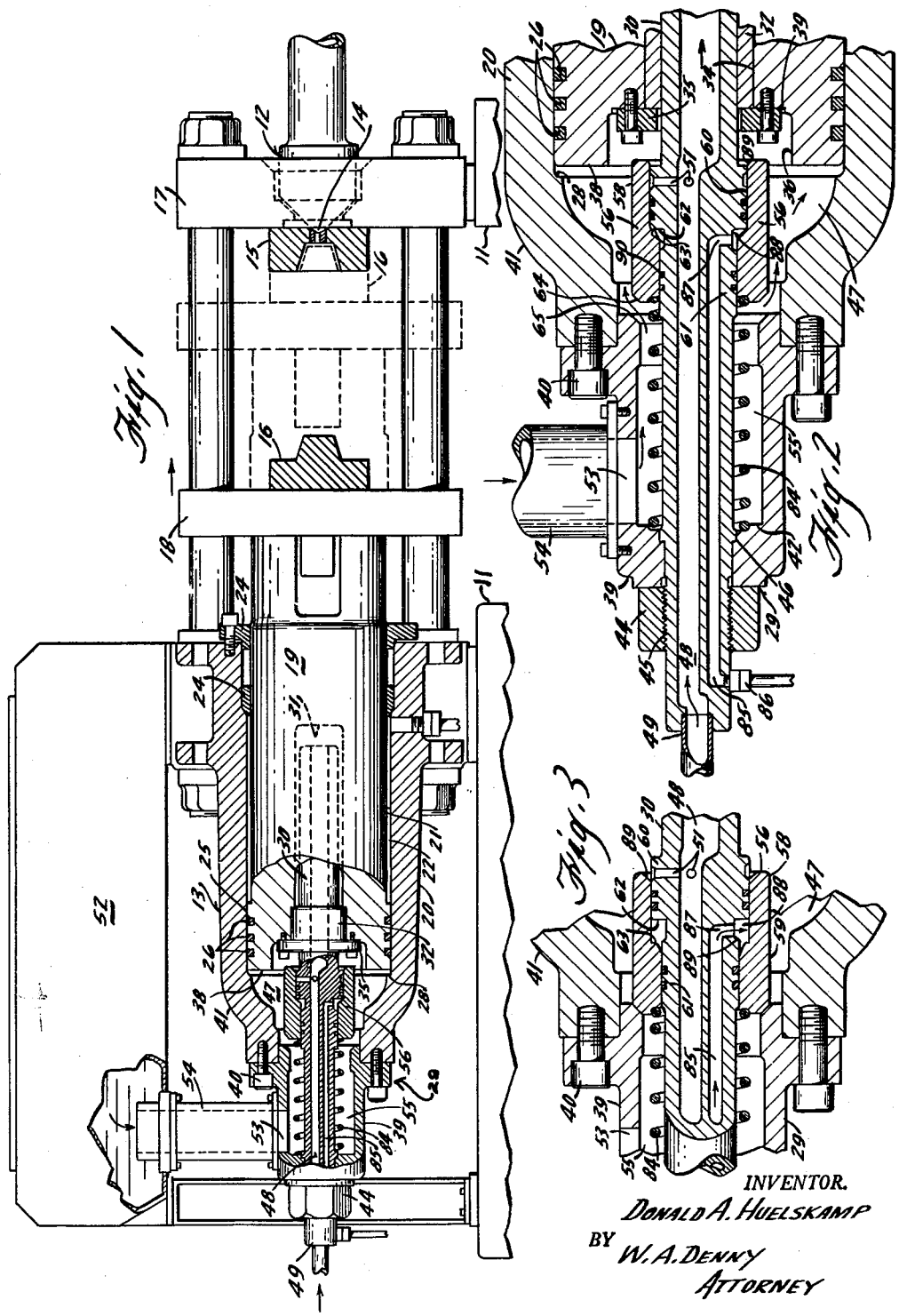
INVENTOR.
DONALD A. HUELSKAMP
BY W. A. DENNY
ATTORNEY April 9, 1963　　　D. A. HUELSKAMP　　　3,084,512
HYDRAULIC MOLDING MACHINES
Filed March 10, 1958　　　　　　　　　　2 Sheets-Sheet 2

INVENTOR.
DONALD A. HUELSKAMP
BY W. A. DENNY
ATTORNEY 3,084,512
HYDRAULIC MOLDING MACHINES
Donald A. Huelskamp, Mount Gilead, Ohio, assignor to Koehring Company, Milwaukee, Wis., a corporation of Wisconsin
Filed Mar. 10, 1958, Ser. No. 720,228
12 Claims. (Cl. 60—52)

This invention relates generally to hydraulically actuated molding machines of the type having a mold clamp assembly for quickly closing, clamping and opening a mold.

In injection molding machines and the like, it is common to effect an initial high-speed movement of the main ram to mold closing position by means of a smaller booster ram. The advantage of this is that a given amount of pressure fluid supplied to the booster cylinder will effect a much faster and greater ram movement than it would if supplied to the main ram cylinder. This construction however requires that fluid prefill means be provided for keeping the main ram cylinder filled with fluid as the main ram is moved under the action of the booster ram. It also requires that valve means be provided for shifting the flow of pressure fluid from the booster ram to the main ram when the latter reaches that point in its travel at which full ram pressure is desired. This construction further requires that valve means be provided for quickly closing the large prefill line to the main cylinder just before the shiftover of the high pressure fluid which is commonly at a pressure of 3000 lbs./sq. in. or higher.

The prior art machines providing the above-mentioned apparatus have presented severe manufacturing and assembly problems particularly in the construction of the main cylinder casting. They have further required the use of at least two large and expensive valves which are very difficult to synchronize for obtaining optimum clamping speed.

Accordingly, an object of the present invention is the elimination of certain objectionable features of existing mold clamping assemblies for effecting improvements in their operation and economies in their manufacture and assembly.

Another object of the present invention is to provide a mold clamp assembly of the booster ram type in which the booster ram, prefill valve and the clamp main cylinder shiftover valve are combined into one simple sub-assembly which inherently provides proper valve sequencing.

A further object of the present invention is to provide a booster ram type mold clamp assembly which does not require large high-pressure pipes and fittings. A more detailed object is to provide a construction in which the booster ram assembly may be easily removed and inserted without necessity for removing the main ram.

Other objects and advantages of the present invention will become apparent as the following description proceeds, taken in connection with the drawings in which:

FIGURE 1 is a side elevation partially in section of a mold clamp assembly embodying the present invention;

FIG. 2 is a fragmentary cross-sectional view of the same assembly showing the condition of the booster ram assembly as the main ram is moved by the booster ram.

FIG. 3 is a fragmentary cross-sectional view of the apparatus of FIG. 2 showing the condition of the booster ram assembly when high pressure fluid is supplied to the main ram.

Figures 4, 5:
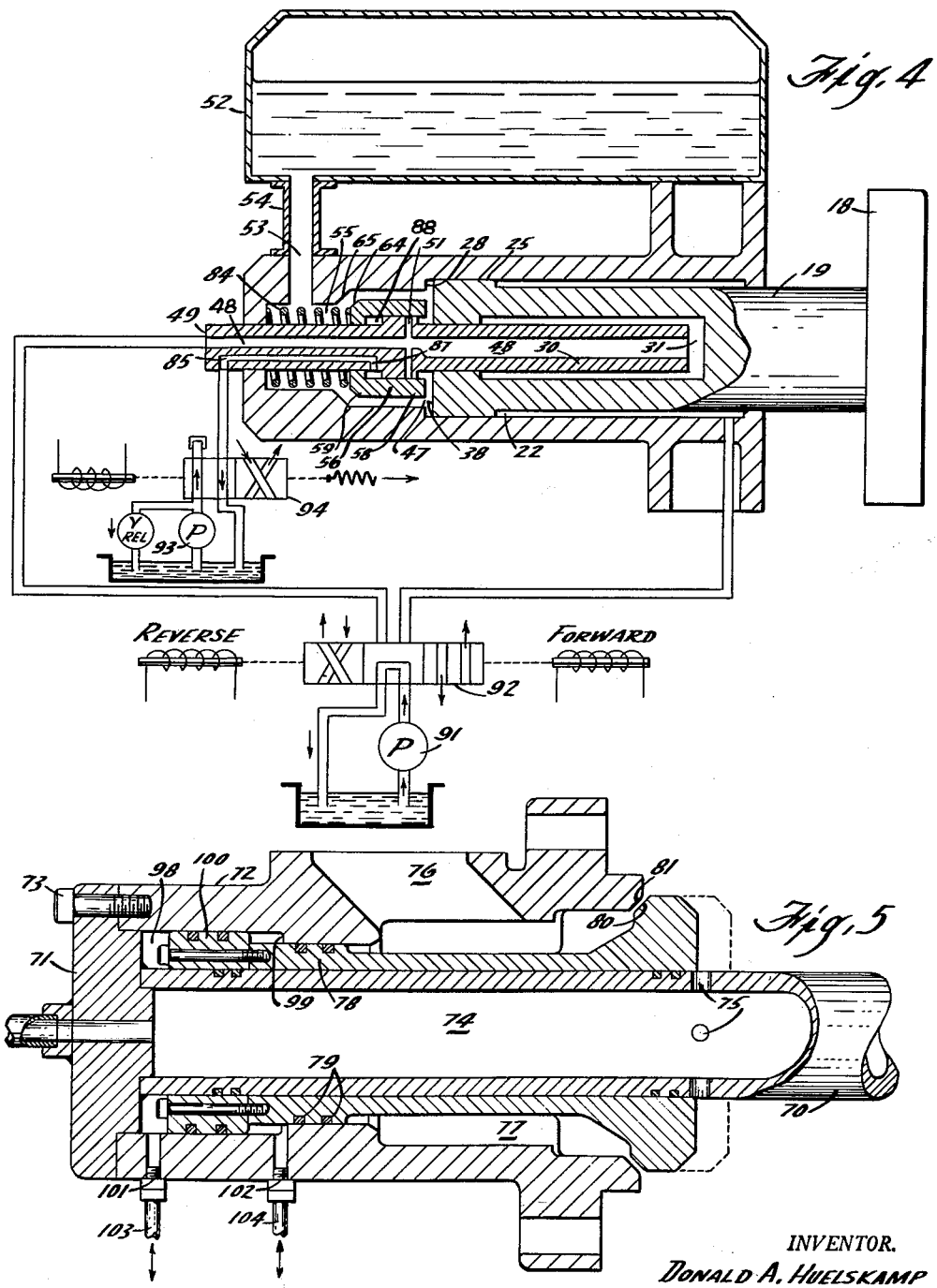
FIG. 4 is a diagrammatic representation of a suitable hydraulic system for utilizing apparatus embodying the present invention.
FIG. 5 is a cross-sectional view of a booster ram assembly embodying an alternative embodiment of the present invention.

While the invention is susceptible of various modifications, certain preferred embodiments have been shown in the drawings and will be described below in considerable detail. It should be understood that there is no intention to limit the invention to the specific forms disclosed, but, on the contrary, the intention is to cover all modifications and alternative constructions falling within the spirit and scope of the invention as expressed in the appended claims.

In FIG. 1 of the drawing, there is shown an injection molding machine embodying the present invention and having a frame 11 with an injection mechanism assembly 12 and a mold actuating or clamp mechanism assembly 13 on adjacent portions of the frame. The injection mechanism assembly 12 is of conventional form and includes an injection nozzle 14 through which plastic material passes in a well-known manner into a cavity defined by mold halves 15, 16.

In order to hold the mold halves in face-to-face contact during the injection of the plastic material and to permit subsequent removal of the molded piece, a horizontally movable platen 18 carries one mold half 16 toward and from a stationary die head 17 which supports the second mold half 15. For this purpose the mold clamp assembly 13 is provided with a main ram 19 which is horizontally reciprocable in a ram cylinder 21 and which has secured to its outer end the movable platen 18.

In practicing the present invention, means are provided for operating the main ram 19 to give rapid closing movement of main ram 19 with a slow but powerful final approach and clamping action. For this purpose, the clamp assembly comprises the main ram assembly and a novel booster ram assembly having a sequentially-acting valve assembly.

The ram cylinder 21 is formed in a generally cylindrical housing 20 by a longitudinally positioned, open-ended cylindrical bore. To actuate the ram 19, pressure fluid may be applied to a pressure chamber behind the ram for forward movement or to an annular cavity 22 surrounding the ram for return movement. For the latter purpose, the forward or outer end of the cavity 22 has suitable seals, such as ring seals 24, to prevent escape of pressure fluid, and to permit reciprocation of the main ram 19. The rear or inner end of the ram 19 has an enlarged portion 25 forming an annular area against which the pressure fluid acts to return the ram. The enlarged portion or flange has suitable fluid seals, such as piston rings 26, which likewise permit reciprocation of main ram 19. Return movement of the ram 19 is limited by an internal abutment or shoulder 28 formed in the inner wall of the main ram cylinder bore 21. Forward movement is limited by engagement of the mold halves 15, 16.

To provide a rapid closing movement of the main ram 19, and a slow, powerful final approach and clamping action, means are provided for applying pressure fluid to differential areas on the rear or inner end of the main ram 19. For rapid traverse, the means are in the form of a booster ram assembly 29 to apply fluid pressure to a relatively small area of the main ram 19. In the present instance, the booster ram assembly includes a stationary booster ram 30 of cylindrical shape which projects forwardly into an axial bore or compartment 31 called the booster ram cylinder, formed centrally in the rear or inner end portion of the main ram 19.

The booster ram cylinder 31 is of sufficient length to allow axial clearance between the forward end of the booster ram 30 and the bottom of the compartment when the main ram 19 is fully retracted. The bottom or forward closed end wall of the booster compartment 31 provides a first differential, or booster, area against which hydraulic pressure fluid acts to force the main ram 19 forwardly in rapid forward or closing movement.

Referring also to FIGS. 2 and 3 of the drawings, sealing the open rear end of the booster compartment or cylinder 31 and maintaining the booster and main rams in substantially coaxial sliding relation, is a tubular collar 32 seated in a counterbore 34 in the rear end portion of the booster cylinder 31. The tubular collar 32 has an inner diameter which permits sliding engagement with the booster ram 30 and is held in position by an annular plate or retaining ring 35. This retaining plate is secured to the rear face of the main ram 19, and has its inner edge portion extending radially inwardly over the exposed end of the collar 32 blocking rearward displacement of the latter. For the purpose of providing clearance, the retaining plate 35 is preferably recessed into the end face of the main ram 19 by mounting it on the bottom surface of a second counterbore 36 having a diameter large enough to receive the retaining plate 35.

The booster ram 30 is supported at its outer end by a hollow, cylindrical housing 39 which is secured as by bolts 40 to a rear end section 41 of the main ram cylinder housing 20, which is of reduced diameter to mate with the forward end of the booster ram housing 39 and form a fluid-tight joint between the housings. However, it should be noted that the opening in the end section 41 is of sufficient diameter to permit passage therethrough of the booster ram assembly. The booster ram 30 extends through the rear end wall 42 of its housing 39 and is securely mounted on the rear wall by a nut 44 received on a threaded section 45 of the booster ram. Tightening of the nut 44 against the outside of the wall 42 draws an external flange or shoulder 46 on the ram 30 into engagement with the inside of the wall 42 to hold the ram securely in position.

A second differential pressure area on the main ram is provided by the remaining annular area on the rear end face 38 surrounding the booster ram cylinder 31, and includes the annular retaining plate 35 and any exposed portion 39 of its receiving counterbore 36. The fluid applied to the second differential pressure area of the main ram is received in a chamber 47 formed by the rear section 41 of the main ram cylinder housing 20 and the forward end of the booster ram housing 39. The chamber, of course, includes the main ram cylinder 21 as the ram 19 moves outwardly.

For conducting pressure fluid to the operative ram areas and for actuating control mechanisms to be described later, the booster ram 30 is further provided with conduit means extending axially thereof from the rear to the forward end of the booster ram. The conduit means comprises a longitudinal bore 48 extending from a suitable high pressure inlet fitting 49 at its rear end forwardly to its forward end at which place the bore is in communication with the booster ram cylinder 31. Thus, when fluid is supplied to the inlet fitting 49, the pressure is applied continuously to the first or booster pressure area of the main ram 19.

Because of the relatively small cross-sectional area of the booster ram 30 and booster ram cylinder 31, only a small volume of pressure fluid need be supplied to move the main ram 19 forwardly. Consequently, for a given rate of supply of pressure fluid, the main ram 19 is pushed forward rapidly to provide rapid traverse for closing the mold. It will be appreciated, however, the force moving the ram is relatively small because of the small pressure area at the bottom of the booster ram cylinder 31.

Further, means are provided for minimizing the amount of pressure fluid which must be delivered to the clamping assembly for applying clamping pressure. In more detail, means are provided for controllably prefilling the main ram pressure chamber 47 with fluid under little or no pressure during rapid traverse of the main ram 19 to permit at the cessation of rapid traverse rapidly increasing the pressure in the main ram chamber to clamp the molds together. In the illustrated embodiment of FIG. 1, a tank 52, called a prefill tank, is mounted above the clamping assembly and contains hydraulic fluid of the same kind as that to be used in the high-pressure conduits. A short pipe 54 leads from the bottom of the prefill tank to a suitable opening 53 in the top of the booster ram housing 39. The prefill fluid flows by gravity from the prefill tank through the pipe 54 into an annular space or passage 55 formed between the booster ram 30 and the inside of the booster ram housing 39. The forward end of the annular passage 55 is open for communication with the rear face of the main ram 19. Consequently, as the main ram moves forwardly under the action of the booster ram, prefill fluid flows into the expanding space behind the main ram keeping that space full of fluid. Thereafter pressure fluid may be supplied to the main ram through the ports 51 which provide a fluid passageway between the booster ram bore 48 and the outside surface of the ram located in the fluid chamber 47.

For controlling the flow of prefill fluid as well as applying high pressure to it for clamping, a simple and compact valve means is provided. In the illustrative embodiments of the invention shown in FIGS. 1–4, the valve member is formed by a tubular or cylindrical sleeve 56 slidably mounted on the intermediate portion of the booster ram 30 and having integral first and second concentric portions 58, 59. The forward portion 58 overlies booster ram section 60 in which are located the radial pressure fluid ports 51, and the rear portion 59 overlies the adjacent rearwardly positioned section 61 of the booster ram 30. The internal diameters of the valve portions 60, 61 and external diameters of the respective booster ram sections are substantially equal to provide a sliding fit between the sleeve 56 and ram 30.

The forward portion 58 of the sleeve and the underlying booster ram section 60 have greater diameters than the rear portion and section 59, 60, to form a rearwardly facing abutment or shoulder 62 on the ram 30, and a forwardly facing shoulder 63 on the sleeve which limits its forward movement and which provides a surface for receiving fluid pressure in a manner to be hereafter described. Rearward movement of the valve sleeve 56 is limited by engagement between an annular bevelled valve seat 64 on the outer rear corner of the sleeve, and a mating, annular, bevelled seat 65 on the inside forward end of the booster ram housing 39.

By the described forward and rearward sliding movement, the valve sleeve 56 controls both the admission of prefill fluid and the application of pressure to the main or second pressure area of the main ram 19. In its forward limit position, sleeve 56 covers and therefore closes the radial ports 51 in the booster ram, preventing loss of pressure fluid to the main pressure area of the main ram 19. At the same time, the annular valve seat 64 on the rear of the sleeve 56 is spaced from the mating valve seat 65 on the booster ram housing opening passage 55 and permits prefill fluid to flow into or out of the main ram pressure chamber 47. In its rearward limit position, the bevelled valve seats 64, 65 are engaged so that the valve sleeve 56 blocks the open forward end, or port, of the annular prefill liquid passage 55 and prevents flow of prefill fluid, while uncovering the ports 51 to permit high-pressure fluid from inlet 49 to enter the main ram pressure chamber 47. The obvious advantage of this construction is that the opening of the one fluid passageway effects the closing of the other, and vice versa. In this manner there is provided an inherently correct sequencing of the two valving functions.

Actuation of the valve means positioned within the booster ram assembly is accomplished by applying biasing forces to the valve sleeve. In the embodiment of FIGS. 1–3, a forward biasing force is applied to the valve sleeve 56 by a compression coil spring 84 which is positioned around the booster ram 30 between the rear wall 42 of the ram housing and the rear face of the valve sleeve 56. This force moves the sleeve 56 to its forward or initial position which opens prefill passage 55 and closes the high-pressure ports 51.

To move the sleeve 56 to its rearward position, an auxiliary or pilot pressure fluid is utilized. For this purpose, the booster ram 30 has a second fluid conduit or bore 85 which extends longitudinally of the ram 30 and substantially parallel to the high-pressure conduit or bore 48. Communicating with the rear end of the second conduit or bore, is an inlet fitting 86 for receiving pilot or control pressure fluid. At its forward or inner end, conduit 85 communicates with the exterior surface of booster ram 30 through port 87 located at the juncture of the sections 60, 61 underlying the valve sleeve 56. At the intersection of port 87 with exterior surface, a circumferential groove 81 is formed in the exterior of the booster ram intermediate the sections 60, 61, to conduct control fluid from port 87 to the forwardly facing internal shoulder 63 on the valve sleeve. The shoulder 63 may have a slight bevel or taper to permit control fluid to press against the latter even when it is in the forward position against shoulder 62. Sealing means, such as rings 90, may also be used to limit leakage of fluid between the ram 30 and sleeve 56.

In the embodiment of the invention illustrated in FIG. 5, the valve means and booster ram assembly are shown in a somewhat modified form. The booster ram in this embodiment comprises a hollow, cylindrical member 70 of substantial uniform diameter which is welded or otherwise suitably secured by a fluid-tight connection to the rear end wall 71 of a cylinder booster ram housing 72 similar to the housing 39 of FIGS. 1–3. The rear wall 71, for convenience of manufacture and assembly, is shown as a circular plate fastened by bolts 73 on the rear of the housing 72. Centrally of the rear wall plate 71 is an opening for introduction of high-pressure fluid to the center or bore 74 of the hollow booster ram 70. Thus, the embodiment of FIG. 5 also has branch circuits for the high-pressure fluid. One branch extends axially to the forward end of the booster ram in the same manner described previously, and a second branch is provided by radial ports 75 which communicate with the main ram pressure chamber in the same manner as ports 51 of FIGS. 1–3.

The ram housing 72 of FIG. 5 also has a prefill port 76 in its top portion and an annular cavity 77 surrounding the forward portion of the booster ram 70 for the same purposes as the port 53 and annular cavity 55 of FIGS. 1–3.

The valve means of FIG. 5 comprises an elongated cylindrical sleeve 78 surrounding the booster ram 70 and axially slidable thereon. Sleeve 78 extends rearwardly of the prefill port 76 and has sealing rings 79 on its rear portion to close the rear of the prefill cavity 77. The forward end of the valve sleeve 78 is enlarged to provide a rearwardly facing annular bevelled valve seat 80 which mates with an annular bevelled valve seat 81 formed on the inner forward edge of the ram housing 72 when the sleeve 78 is in its rear position in the same manner as the mating valve seats 64, 65 of FIGS. 1–3. In the forward position of sleeve 78, the radial high-pressure ports 75 are closed as shown in dotted outline in FIG. 5. Consequently, although of modified form, the valve means of FIG. 5 provides the same valving action as the valve means of FIGS. 1–3.

Still referring to FIG. 5, means are provided for actuating the valve sleeve 78 by pilot or control fluid in both its forward and rearward movement. For this purpose, the booster ram housing 72 and valve sleeve 78 are constructed to provide a double-acting piston arrangement. The rear portion of the booster ram housing 72 has an increased diameter to form a valve actuation cylinder 98 interposed between the rear wall plate 71 and an internal shoulder 99. The piston section 100 on the rear end of the sleeve 78 provides in cooperation with the cylinder 98 a double-acting ram for effecting reverse movements of said sleeve. Leading to opposite ends of the valve actuating cylinder 98 are pressure fluid ports 101, 102 and conduits 103, 104. Thus, by alternatively connecting the fluid ports to the output of a pilot or control fluid system, such as illustrated in FIG. 4, and to drain, the valve sleeve 78 may be readily actuated between its forward limit position, determined by engagement of piston 100 and shoulder 99, and its rearward limit position determined by engagement of the prefill valve seats 80, 81.

Operation of the structure illustrated in FIGS. 1–3 will now be described with reference to FIG. 4 of the drawings which shows diagrammatically fluid supply systems operatively connected to the clamping assembly. The main ram 19 and valve means are shown in their initial positions with the ram 19 in its return or retracted position. High pressure fluid is supplied to the clamping assembly by pump 91, through a solenoid-operated reversing valve 92. When the Forward solenoid of valve 92 is energized, the left-hand section of the valve admits high-pressure fluid to the high-pressure inlet fitting through high-pressure conduit 48 and into the booster ram cylinder 31, causing rapid advance of the main ram 19. Advance of the main ram 19 creates a suction behind it which draws prefill fluid into the main cylinder housing 20 as previously described.

When the rapid closing mold clamp mechanism has proceeded sufficiently to attain the desired platen position relative to diehead 17, pilot or control pressure fluid is supplied by pilot pump 93 through solenoid-operated cylinder shift valve 94 to inlet 85. The pilot fluid then flows through the second conduit 85 in booster ram 30 and out of port 87 into the annular groove 88 where it bears upon a bevelled inner shoulder of the valve 56. The force of the pilot fluid upon shoulder 63 is such that it exceeds the fixed forward thrust of compression spring 84 and urges sleeve 56 toward its rearward position. As sleeve 56 reaches its rear position, the valve seats 64, 65 close the prefill passage 55 to prevent reverse flow of fluid therethrough and permit build-up of pressure in the cylinder 47.

As the valve sleeve 56 moves rearwardly, the forward end of the sleeve, which may be bevelled as at 89, reaches and passes the ports 51, permitting flow of high-pressure fluid through the ports 51 into the main ram pressure-fluid chamber 47 in clamp cylinder 20. The fluid from the high-pressure circuit now acts upon the main or second area of the main ram in addition to acting on the first or booster area. The total ram area acted upon by the high-pressure fluid is thus greatly increased, giving a slower final closing of the mold halves with an increased clamping force.

To maintain clamping force on the molds, the reversing valve 92 may be left in the forward position, or if desired, may be shifted to the neutral position, as shown in FIG. 4. Control circuits for effecting operation of valves 92 and 94 in the manner and sequence herein described are well known to those skilled in the injection molding machine art. For example, in U.S. Patent No. 2,680,883, issued June 15, 1954, there is illustrated a control circuit in which limit switches are used for effecting operation of a main pressure valve and a high pressure distributing valve at selected positions in the travel of the main ram of an injection molding machine.

To retract the main ram 19, the Reverse solenoid of valve 92 is energized to bring the right-hand section of the valve into the circuit. This opens the high-pressure inlet 49 to drain and directs the output of the high-pressure pump 91 to the return chamber 22 of the main ram cylinder 21. Substantially simultaneously with the withdrawal of high-pressure fluid from the inlet and booster ram conduit 48, the pilot circuit is also opened to drain by shifting the pilot valve 94 so that the pressure in the pilot circuit is reduced sufficiently to allow spring 84 to open prefill passage 55 and close booster ports 51. While the thrust of spring 84 is thus relieved of resistance from the pressure in the pilot circuit, it still encounters resistance from the pressure fluid in the main ram pressure chamber. This pressure however is lost through ports 51, and conduit 48, to drain. When the pressure is reduced sufficiently for spring 84 to effect a partial opening of the prefill passage 55, the pressure remaining in cylinder 47 is lost and the sleeve means 56 completes its forward movement to completely open prefill passage 55 and close booster ports 51. The remaining fluid in cylinder 47 is then returned to the prefill tank 52 in response to the rearward movement of main ram 19 resulting from the introduction of pressure fluid in pushback cavity 22 as previously described.

The sequence of operation of the structure of FIG. 5 is the same as that of FIG. 4 except that forward movement of the valve sleeve 78 is caused by forward biasing hydraulic pressure rather than the elastic or resilient force of spring 84.

It will be understood that other high pressure and control or pilot pressure supply circuits and systems may be used depending on the particular application of the invention.

I claim as my invention:

1. In an apparatus of the type described, the combination comprising, a clamp cylinder; a main ram; a booster ram having a generally cylindrical shape; a booster ram housing coacting with said booster ram to define therebetween a prefill passage for supply of prefill fluid to said cylinder; said booster ram having a plurality of independent conduit means defined therein axially thereof, one of said conduit means including one branch for conducting pressure fluid to said booster ram, and a second branch including radially extending booster port means defined in a medial portion of said ram; and a sleeve valve circumscribing said booster ram in sliding engagement therewith adjacent said booster port and selectively actuable axially along said booster ram into and out of blocking engagement with said booster port means while simultaneously opening and closing said prefill port, another of said conduits in said booster ram being connected for applying pilot pressure to said sleeve means for selectively actuating said sleeve means independently of the fluid pressure in said first-mentioned conduit means.

2. A combination prefill valve and main clamp shiftover valve assembly for use with a molding machine having a booster ram for effecting an initially fast closing movement of a mold and a main ram for effecting a final slow closing movement of the mold, said valve assembly comprising, a valve housing defining a passageway for prefill fluid between a prefill fluid tank and said main ram; high pressure fluid conduit means positioned within said housing for supply of pressure fluid to said booster ram and having port means for supply of pressure fluid to said main ram; a valve member positioned within said housing, said valve member being movable to one position where it opens said prefill fluid passageway and blocks said high pressure fluid port means and being movable to another position in which it blocks the said prefill fluid passageway to the tank and opens said high pressure fluid port means for supply of high pressure fluid to said main ram; and means independent of the pressure in said fluid conduit means for effecting movement of said valve member to said another position prior to closing of said mold whereby a final slow closing movement of said mold may be effected.

3. A prefill valve assembly for use with a horizontally disposed clamping cylinder in an injection molding machine, said assembly comprising, a housing having a centrally disposed cavity and flange means encircling the mouth of said cavity for effecting mounting of said housing at the rear end of a clamping cylinder; a booster ram including a high pressure fluid conduit centrally disposed within said cavity and defining with said housing an annular prefill fluid passageway; means defined in the top of said housing for connecting said passageway with a prefill fluid conduit; fluid port means defined in said high pressure fluid conduit for supply of high pressure fluid to the clamping cylinder; a valve member movable within said cavity to a first position for closing said high pressure fluid port means and opening said prefill fluid passageway, said valve member being movable to a second position for opening said high pressure fluid port means and closing said prefill fluid passageway; and means including a hydraulic ram connected to said movable valve member for effecting actuation thereof at any selected position of said main ram; said actuating means also including conduit means connected for supply of pilot pressure fluid to said valve actuating hydraulic ram and valve means for selectively controlling the supply of pilot pressure fluid to said valve actuating hydraulic ram.

4. An injection molding machine clamp mechanism comprising, a main ram for effecting slow mold clamping movement; a booster ram for effecting high speed mold clamping movement of said main ram; prefill fluid conduit means for supplying prefill fluid to said main ram; high pressure fluid conduit means positioned concentrically with said prefill fluid conduit means and having one branch for supply of high pressure fluid to said booster ram and a second branch for supply of high pressure fluid to said main ram; a sleeve valve member movably mounted on said high pressure fluid conduit for movement to one position to open said prefill fluid conduit and close said second branch of said high pressure fluid conduit for effecting high speed low pressure movement of said main ram, said valve member being movable to a second position prior to mold closing for closing said prefill fluid conduit and opening said second branch of said high pressure fluid conduit for effecting low speed high pressure movement of said main ram; and means for moving said valve member to either of said positions at any selected position of said main ram.

5. In an injection molding machine, an improved assembly for selectively effecting high and low speed movement of a platen, said assembly comprising a main ram for effecting low speed platen movement; a booster ram connected to a booster ram chamber in said main ram for effecting high speed platen movement; a main ram housing defining a chamber for said main ram and having at the rear end thereof an opening for insertion therethrough of said booster ram and for passage of prefill fluid; a booster ram housing removably secured to said main ram housing for supporting the rear end of said booster ram, said booster ram housing defining a passageway for flow of prefill fluid into and out of said main ram chamber; conduit means defined in said booster ram having a first port for conducting high pressure fluid to the booster ram chamber and a second port for conducting high pressure fluid to the main ram chamber; valve means mounted on said booster ram conduit means for movement in one direction to open said prefill fluid passageway and block flow of high pressure fluid through said second high pressure port for effecting high speed platen movement, and for movement in another direction to block said prefill fluid passageway and open said second high pressure port for effecting slow speed platen movement; and means controllable independently of the fluid pressure in said conduit means for effecting movement of said valve means at any selected position of said main ram.

6. In a molding machine, a cylinder, a main ram reciprocable therein with the volume in said cylinder behind said main ram constituting a main ram cavity, a booster ram stationary relative to said cylinder and provided with ports, said main ram having a booster ram cavity therein and said booster ram entering said last cavity, a combined prefill and change-over valve comprising a sleeve surrounding said booster ram and having an enlarged closure element in said main ram cavity, a seat in the inner end of said cylinder for said closure element, said valve having an actuating piston also surrounding said booster ram, said cylinder having a reduced bore beyond said inner end thereof serving as a cylinder for said actuating piston, means for seating said closure element on said seat, said valve when in unseated position by introduction of fluid under pressure to said reduced bore, establishing communication between a fluid reservoir and said main ram cavity through said seat and past said enlarged closure element, and at the same time cutting off communication between said cavities by said sleeve covering said ports, and when in seated position blocking communication between said fluid reservoir and said main ram cavity and at the same time establishing communication between both of said cavities by said sleeve uncovering said ports whereby fluid under pressure supplied to said booster ram cavity also flows to said main ram cavity for slow advance of said main ram.

7. In a molding machine, a cylinder, a main ram reciprocable therein with the volume in said cylinder behind said main ram constituting a main ram cavity, a booster arm stationary relative to said cylinder, said main ram having a booster ram cavity therein and said booster ram entering said cavity, a combined prefill and change-over valve surrounding said booster ram and having a closure element, a seat in said cylinder for said closure element, said valve having an actuating piston, said valve when in one position establishing communication between a fluid reservoir and said main ram cavity and cutting off communication between said cavities, and when in another position cutting off communication between said fluid reservoir and said main ram cavity and establishing communication between both of said cavities whereby fluid under pressure supplied to said booster ram cavity also flows to said main ram cavity for slow advance of said main ram, said cylinder having a pull back cavity, a main pump, a first valve for forward and return control of the output of said main pump to and from said booster ram cavity and said pull back cavity, a pilot pump, a second valve for on-off control of the output from said pilot pump to said actuating piston of said combined prefill and change-over valve, and an electric circuit for actuating said first and second valves to effect forward and return movement of said main ram and to effect during the forward stroke of said main ram and before the end thereof movement of said combined prefill and change-over valve from prefill position to change-over position.

8. In a molding machine, a cylinder, a main ram reciprocable therein with the volume in said cylinder behind said main ram constituting a main ram cavity, a booster ram stationary relative to said cylinder, said main ram having a booster ram cavity therein and said booster ram entering said cavity, a combined prefill and change-over valve surrounding said booster ram and having a closure element, a seat in said cylinder for said closure element, said valve having an actuating piston, said valve when in one position establishing communication between a fluid reservoir and said main ram cavity and cutting off communication between said cavities, and when in another position cutting off communication between said fluid reservoir and said main ram cavity and establishing communication between both of said cavities whereby fluid under pressure supplied to said booster ram cavity also flows to said main ram cavity for slow advance of said main ram, said cylinder having a pull back cavity, a main pump, a first valve for forward and return control of the output of said main pump to and from said booster ram cavity and said pull back cavity, a pilot pump, a second valve for on-off control of the output from said pilot pump to said actuating piston, and an electric circuit for actuating said first and second valves to effect forward and return movement of said main ram and to effect during the forward stroke of said main ram and before the end thereof movement of said combined prefill and change-over valve from prefill position to change-over position.

9. In a molding machine, a cylinder, a main ram reciprocable therein with the volume in said cylinder behind said main ram constituting a main ram cavity, a booster ram, a combined prefill and change-over valve having a closure element, a seat in said cylinder for said closure element, means normally seating said closure element on said seat, said valve when in unseated position establishing communication between a fluid reservoir and said main ram cavity, and when in seated position blocking communication between said fluid reservoir and said main ram cavity and establishing communication between said booster ram and said main ram cavity whereby fluid under pressure supplied to said booster ram also flows to said main ram cavity for slow advance of said main ram, said cylinder having a pull back area, a main pump, a first valve for forward and return control of the output of said main pump to and from said booster ram and said pull back area, a pilot pump, a second valve for on-off control of the output from said pilot pump to said actuating piston of said combined prefill and change-over valve, an electric circuit for actuating said first and second valves to first supply oil from said main pump to said booster ram and from said pilot pump to said combined prefill and change-over valve for moving it to said another position, then supply oil to said main ram and said booster ram together while permitting said combined prefill and change-over valve to assume said seated position, and then supply oil to said pull back area to thereby return said main ram to its initial position while said prefill valve is again in said another position.

10. In a molding machine, a main ram, a booster ram, a combined prefill and change-over valve having an actuating piston, said valve when in one position establishing communication between a fluid reservoir and said main ram and when in another position establishing communication between said rams, a main pump, a first valve for forward and return control of the output of said main pump to and from said rams, a pilot pump, a second valve for on-off control of the output from said pilot pump to said actuating piston, and an electric circuit for actuating said first and second valves to effect forward and return movement of said main ram and to effect during the forward stroke of said main ram and before the end thereof movement of said combined prefill and change-over valve from said one position to said another position and during the return stroke of said main ram to said one position.

11. In a molding machine, a main ram, a booster ram, a combined prefill and change-over valve, actuating means therefor, said valve when in one position establishing communication between a fluid reservoir and said main ram and cutting off communication between said rams, and when in another establishing communication between said rams for slow advance of said main ram, a main pump, a pilot pump, a first valve for forward and return control of the output of said main pump to and from said rams, a second valve for on-off control of the output from said pilot pump to said actuating means, control means operable in different positions of said main ram for operating said first and second valves, said main ram before the end of its forward stroke effecting through said control means movement of said second valve to off position and thereby said combined prefill and change-over valve from said one position to said another position, said main ram at the end of its forward stroke effecting through said control means shift of said first valve from forward to return positions and said second valve to on position and thereby said combined prefill and change-over valve from said another position to said one position for the return stroke of said main ram, and said main ram at the end of its return stroke effecting through said control means return movement of said first valve to neutral position to thereby stop said main ram at the end of an operating cycle thereof.

12. In a molding machine, a cylinder, a main ram reciprocable therein with the volume in said cylinder behind said main ram constituting a main ram cavity, a booster ram, a combined prefill and change-over valve having a closure element, a seat in said cylinder for said closure element, means for seating said closure element on said seat, said valve when in unseated position establishing communication between a fluid reservoir and said main ram cavity, and when in seated position blocking communication between said fluid reservoir and said main ram cavity and establishing communication between said booster ram and said main ram cavity whereby fluid under pressure supplied to said booster ram also flows to said main ram cavity for slow advance of said main ram, said cylinder having a pull back area, a main pump, a first valve for forward and return control of the output of said main pump to and from said booster ram and said pull back area, a pilot pump, a second valve for on-off control of the output from said pilot pump to said actuating piston of said combined prefill and change-over valve, an electric circuit for actuating said first and second valves to first supply oil from said main pump to said booster ram and from said pilot pump to said combined prefill and change-over valve for moving it to said another position, then supply oil to said main ram and said booster ram together while permitting said combined prefill and change-over valve to assume said seated position, and then supply oil to said pull back area to thereby return said main ram to its initial position while said prefill valve is again in said another position.

References Cited in the file of this patent
UNITED STATES PATENTS

| | | |
|---|---|---|
| 1,926,692 | Tarbox | Sept. 12, 1933 |
| 2,110,972 | Dinzl | Mar. 15, 1938 |
| 2,152,837 | Cannon | Apr. 4, 1939 |
| 2,878,648 | Norman et al. | Mar. 24, 1959 |